(12) United States Patent
Tang et al.

(10) Patent No.: US 8,724,349 B2
(45) Date of Patent: May 13, 2014

(54) APPARATUS AND METHOD FOR OUTPUT VOLTAGE CALIBRATION OF A PRIMARY FEEDBACK FLYBACK POWER MODULE

(75) Inventors: Chien-Fu Tang, Hsinchu (TW); Isaac Y. Chen, Jubei (TW); Liang-Pin Tai, Tainan (TW)

(73) Assignee: Richtek Technology Corp., Hsinchu (TW)

( * ) Notice: Subject to any disclaimer, the term of this patent is extended or adjusted under 35 U.S.C. 154(b) by 214 days.

(21) Appl. No.: 13/173,417

(22) Filed: Jun. 30, 2011

(65) Prior Publication Data

US 2012/0008345 A1  Jan. 12, 2012

(30) Foreign Application Priority Data

Jul. 7, 2010 (TW) ................. 99122333 A

(51) Int. Cl.
*H02M 3/335* (2006.01)
(52) U.S. Cl.
USPC .................... 363/21.18; 363/21.12
(58) Field of Classification Search
USPC ........ 607/4, 5, 7, 12, 14, 34, 29, 28; 324/318, 324/433, 427, 429, 419; 323/267, 268, 271, 323/275, 282, 280; 363/16–20, 21.7, 21.12, 363/12.13, 21.16, 21.18
See application file for complete search history.

(56) References Cited

U.S. PATENT DOCUMENTS

| 5,841,643 | A  | * | 11/1998 | Schenkel ............... 363/21.13 |
| 6,426,628 | B1 | * | 7/2002  | Palm et al. ............... 324/427 |
| 6,721,192 | B1 |   | 4/2004  | Yang et al. |
| 6,958,920 | B2 | * | 10/2005 | Mednik et al. ............... 363/19 |
| 7,057,907 | B2 |   | 6/2006  | Oh |
| 7,616,459 | B2 | * | 11/2009 | Huynh et al. ............... 363/21.12 |
| 2010/0008110 | A1 |   | 1/2010 | Huang et al. |
| 2010/0188881 | A1 |   | 7/2010 | He et al. |

FOREIGN PATENT DOCUMENTS

| CN | 101285848 A | 10/2008 |
| TW | 201003355 A | 1/2010 |

* cited by examiner

*Primary Examiner* — Rajnikant Patel
(74) *Attorney, Agent, or Firm* — Muncy, Geissler, Olds & Lowe, P.C.

(57) ABSTRACT

An apparatus and method for output voltage calibration of a primary feedback flyback power module extract the difference between the output voltage of the power module and a target value, and according thereto, calibrate a reference voltage which is used in regulation of the output voltage, to thereby calibrate the output voltage to be the target value.

8 Claims, 2 Drawing Sheets

APPARATUS AND METHOD FOR OUTPUT VOLTAGE CALIBRATION OF A PRIMARY FEEDBACK FLYBACK POWER MODULE

FIELD OF THE INVENTION

The present invention is related generally to a flyback power module and, more particularly, to an apparatus and method for output voltage calibration of a primary feedback flyback power module.

BACKGROUND OF THE INVENTION

The flyback power module employs a transformer for power delivery from the primary side to the secondary side. For output feedback from the secondary side to regulate the output voltage, the secondary side requires a voltage sensor, typically including a shunt regulator and an optical coupler. However, these devices increase the size and the costs of the power module.

For smaller size and lower costs, some flyback power modules, for example, U.S. Pat. Nos. 5,438,499, 6,480,399, 6,721,192, 6,781,357, 6,833,692, 6,862,194, 6,967,472 and 6,977,824, extract output information from the primary side for stable output voltage. However, such primary feedback flyback power modules lack of secondary side information, and thus will have output offset in different environment which include resistance error or transformer or power supply even different diode. For primary flyback controller, because there is no secondary side information, the accuracy depends on strict transformer and secondary side component production control. This is a big issue for cost and mass-production quality control.

SUMMARY OF THE INVENTION

An object of the present invention is to provide an apparatus and method for output voltage calibration of a primary feedback flyback power module.

According to the present invention, an apparatus for output voltage calibration of a primary feedback flyback power module includes a memory, a digital-to-analog converter, a programmable unit and an adjuster configured to adjust a reference voltage that is used to regulate an output voltage of the power module, thereby calibrating the output voltage to a target value.

According to the present invention, a method for output voltage calibration of a primary feedback flyback power module connects a primary side ground terminal and a secondary side ground terminal of the power module together, applies an input voltage to a power input terminal of the power module, detects an output voltage of the power module to generate a detection signal, extracts the difference between the detection signal and a reference voltage that is used to regulate the output voltage, generates an adjust voltage according to the difference, and adjusts the reference voltage according to the adjust voltage.

In module test, by applying the above apparatus and method to extract the difference between the output voltage and a target value to adjust the reference voltage, it will eliminate the output offset caused by non-ideal factors of a transformer and other components.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
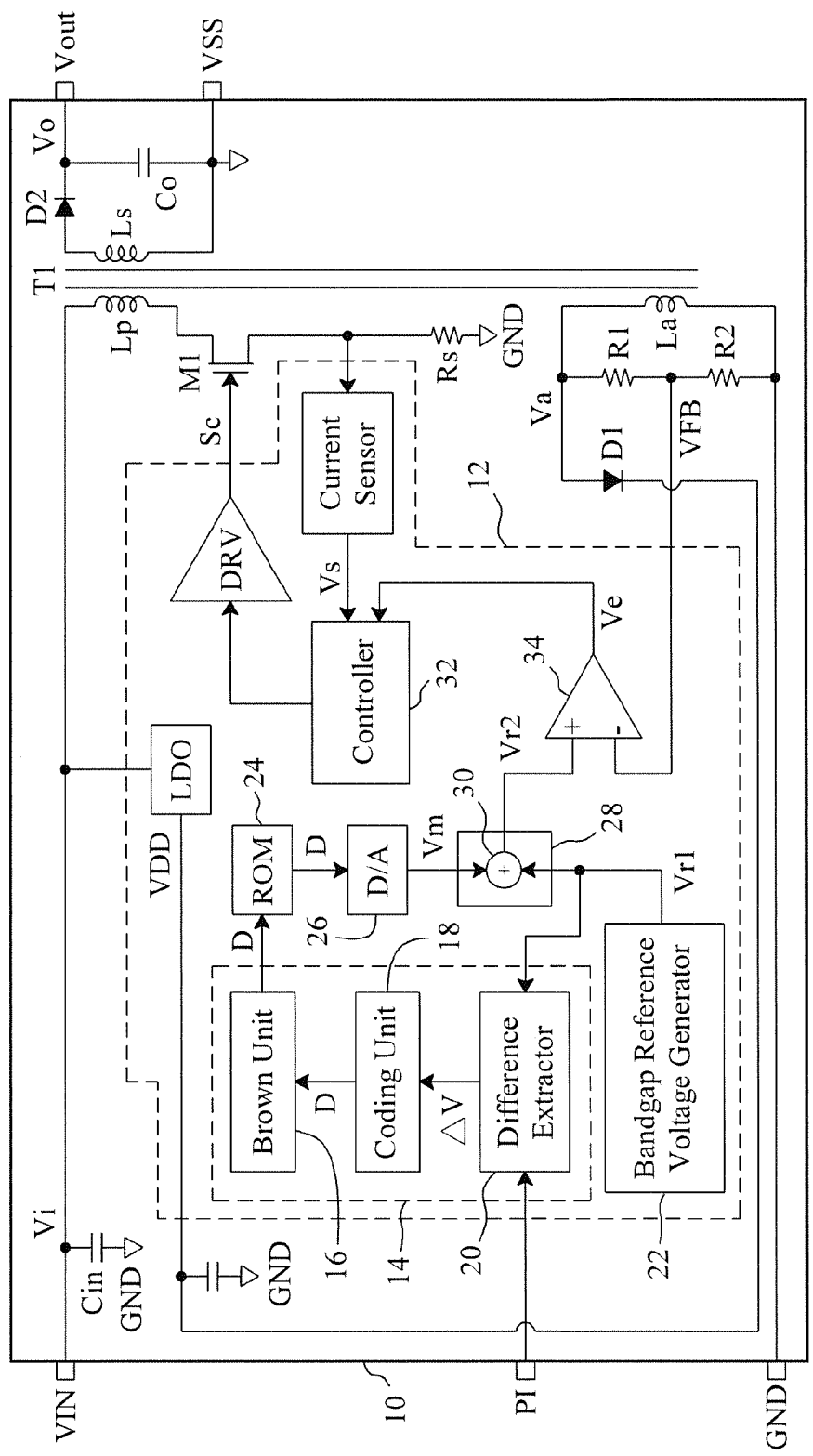
FIG. 1 is an embodiment according to the present invention.

FIG. 1 is an embodiment according to the present invention. In a primary feedback flyback power module 10, a transformer T1 has a primary coil Lp connected with a power switch M1 in series between a power input terminal VIN and a primary side ground terminal GND, a secondary coil Ls connected between a power output terminal Vout and a secondary side ground terminal VSS, and a primary auxiliary coil La to indirectly measure the output voltage Vo by voltage induction from the secondary coil Ls, which generates an induced voltage Va to be divided by voltage divider resistors R1 and R2 to generate a feedback voltage VFB for a control integrated circuit (IC) 12, and the control IC 12 provides a control signal Sc to switch the power switch M1 so as to convert the input voltage Vi into the output voltage Vo. In the control IC 12, an error amplifier 34 amplifies the difference between a reference voltage Vr2 and the feedback voltage VFB to generate an error signal Ve for a controller 32 to regulate the duty cycle of the power switch M1, thereby regulating the output voltage Vo at a stable target value. A bandgap reference voltage generator 22 provides a reference voltage Vr1, and a programmable unit 14, a memory 24, a digital-to-analog converter 26 and an adjuster 28 are configured to generate the reference voltage Vr2 from the reference voltage Vr1. More particularly, the programmable unit 14 generates data D according to the reference voltage Vr1 and a signal received from a programmable input terminal PI of the power module 10, and writes the data D into the memory 24. The memory 24 may be a one time programmable (OTP) memory or a multiple time programmable (MTP) memory. The digital-to-analog converter 26 reads out the data D from the memory 24 and converts the data D into an adjust voltage Vm. In this embodiment, the adjuster 28 includes an adder 30 to add the adjust voltage Vm to the reference voltage Vr1 so as to generate the reference voltage Vr2. Since the reference voltage Vr2 is used to regulate the output voltage Vo, changing the adjust voltage Vm will calibrate the output voltage Vo. In the programmable unit 14, a difference extractor 20 extracts the difference ΔV between the reference voltage Vr1 and the signal received from the programmable input terminal PI, an coding unit 18 converts the difference ΔV into the data D, and a brown unit 16 writes the data D into the memory 24.

Figure 2:
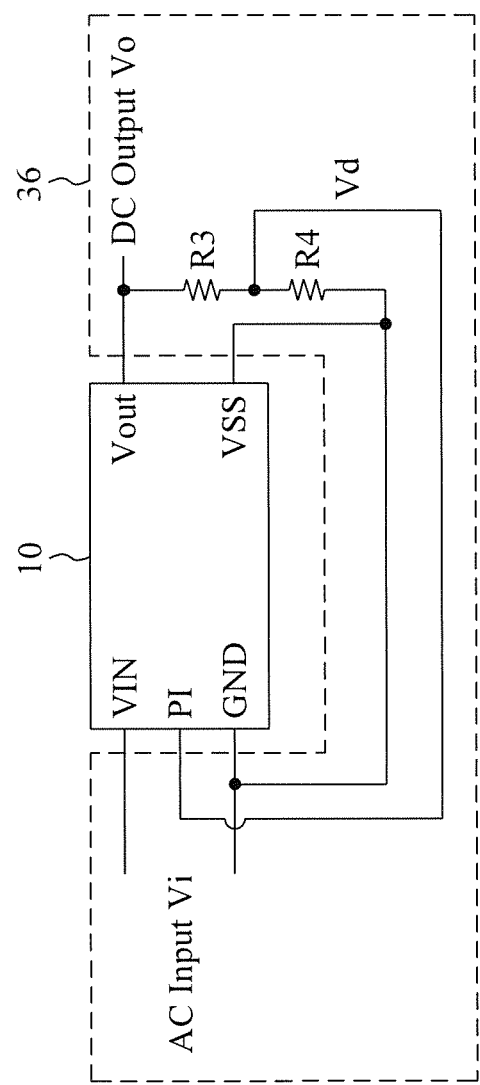
FIG. 2 is a diagram showing module test.

FIG. 2 is a diagram showing a test circuit 36 connected to the power module 10 for module test, in which the test circuit 36 connects the primary side ground terminal GND and the secondary side ground terminal VSS of the power module 10 together, applies an alternating current (AC) voltage Vi to the power input terminal VIN, and uses a voltage divider composed of resistors R3 and R4 to detect the output voltage Vo of the power output terminal Vout to generate a detection signal Vd applied to the programmable input terminal PI. Referring to FIGS. 1 and 2, with the preset target value of the output voltage Vo and the reference voltage Vr1 both given, the resistors R3 and R4 can be such selected that the detection signal Vd is equal to the reference voltage Vr1 when the output voltage Vo is equal to the preset target value. Ideally, Vm=0 and Vr2=Vr1. If the output voltage Vo is different from the preset target value, the detection signal Vd will not equal to the reference voltage Vr1, and thus the difference ΔV generated by the programmable unit 14 will not be zero, the data D converted therefrom is written into the memory 24, and the digital-to-analog converter 26 will generate a non-zero adjust voltage Vm for the adjuster 28 to adjust Vr1 into Vr2=Vr1+Vm, thereby calibrating the output voltage Vo to be the preset target value.

As is well known in the art, the output voltage Vo has ripple. The target value of the output voltage Vo and the calibration to the output voltage Vo as described herein are both referred to the direct current (DC) levels.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for output voltage calibration of a primary feedback flyback power module generating an output voltage regulated according to a reference voltage, the apparatus comprising:
    a memory;
    a digital-to-analog converter connected to the memory, operative to convert data stored in the memory into an adjust voltage;
    a programmable unit connected to the memory and a programmable input terminal of the power module, operative to generate the data according to the reference voltage and a signal received from the programmable input terminal, and write the data into the memory; and
    an adjuster connected to the digital-to-analog converter, operative to adjust the reference voltage according to the adjust voltage;
    wherein the reference voltage is compared with a feedback signal related to the output voltage generated by the primary feedback flyback power module, for regulating the output voltage at a stable target value.

2. The apparatus of claim 1, wherein the programmable unit comprises:
    a difference extractor connected to the programmable input terminal, operative to extract a difference between the signal received from the programmable input terminal and the reference voltage;
    a coding unit connected to the difference extractor, operative to convert the difference into the data; and
    a brown unit connected to the coding unit and the memory, operative to write the data into the memory.

3. The apparatus of claim 1, wherein the memory is a one time programmable memory.

4. The apparatus of claim 1, wherein the memory is a multiple time programmable memory.

5. The apparatus of claim 1, wherein the adjuster comprises an adder to add the adjust voltage to the reference voltage.

6. A method for output voltage calibration of a primary feedback flyback power module including a transformer that has a primary coil between a power input terminal and a primary side ground terminal of the power module and a secondary coil between a power output terminal and a secondary side ground terminal of the power module, the power output terminal providing an output voltage regulated according to a reference voltage, the method comprising the steps of:
    connecting the primary side ground terminal and the secondary side ground terminal together;
    providing an input voltage to the power input terminal;
    detecting the output voltage to generate a detection signal;
    extracting a difference between the detection signal and the reference voltage;
    generating an adjust voltage according to the difference; and
    adjusting the reference voltage according to the adjust voltage.

7. The method of claim 6, wherein the step of generating an adjust voltage according to the difference comprises the steps of:
    encoding the difference to generate data;
    writing the data into a memory; and
    reading out the data from the memory and converting the data into the adjust voltage.

8. The apparatus of claim 1, wherein an output of the memory is connected to an input of the digital-to-analog converter.

* * * * *